United States Patent
Farrell et al.

(10) Patent No.: US 8,248,632 B2
(45) Date of Patent: Aug. 21, 2012

(54) METHOD AND APPARATUS FOR PRINTING AND INSERTING DIVIDERS INTO MULTI-SECTION DOCUMENTS FROM MULTIPLE FILES

(75) Inventors: Michael E. Farrell, Webster, NY (US); Javier A. Morales, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 297 days.

(21) Appl. No.: 12/725,102

(22) Filed: Mar. 16, 2010

(65) Prior Publication Data
US 2011/0228340 A1    Sep. 22, 2011

(51) Int. Cl.
*G06K 15/00* (2006.01)
*G06F 3/12* (2006.01)

(52) U.S. Cl. .................. 358/1.14; 358/112; 358/115

(58) Field of Classification Search .............. 358/1.12, 358/426.05, 1.15, 1.18, 450
See application file for complete search history.

(56) References Cited

U.S. PATENT DOCUMENTS

| | | | | |
|---|---|---|---|---|
| 5,126,858 A * | 6/1992 | Kurogane et al. | ............. | 358/450 |
| 6,549,300 B2 | 4/2003 | Motamed et al. | ............. | 358/1.18 |
| 7,097,369 B2 | 8/2006 | Barry et al. | .................... | 400/62 |
| 7,515,295 B2 | 4/2009 | Kremer et al. | ............... | 358/1.18 |
| 2005/0094193 A1* | 5/2005 | Oswald | ........................ | 358/1.15 |
| 2008/0049242 A1* | 2/2008 | Kimura | ........................ | 358/1.12 |
| 2009/0273804 A1* | 11/2009 | Kobashi | ..................... | 358/1.15 |
| 2010/0060929 A1* | 3/2010 | Koizumi | ..................... | 358/1.15 |
| 2010/0188706 A1* | 7/2010 | Ray | .............................. | 358/1.18 |

* cited by examiner

*Primary Examiner* — Jerome Grant, II
(74) *Attorney, Agent, or Firm* — Kermit D. Lopez; Luis M. Ortiz; Kevin Soules

(57) ABSTRACT

A method and system for inserting dividers in a rendering job. A group of individual files can be compiled into a single document. The individual files can then be arranged in a preferred order. One or more dividers can then be inserted in-between each of the individual files in order to thereafter generate a template that includes a print layout associated therewith and render a complete document, which includes the individual files in the preferred order with the divider(s) automatically inserted therein and including text strings thereof.

20 Claims, 4 Drawing Sheets

METHOD AND APPARATUS FOR PRINTING AND INSERTING DIVIDERS INTO MULTI-SECTION DOCUMENTS FROM MULTIPLE FILES

TECHNICAL FIELD

Embodiments are generally related to rendering systems and methods. Embodiments are additionally related to rendering devices such as, for example, printers. Embodiments also relate to printing and inserting dividers into multi-file and multi-section documents.

BACKGROUND OF THE INVENTION

Multi-page documents can be easily rendered to a rendering device such as, for example, a printer. With advances in computer and printing technologies, there exist capabilities to print multi-page documents with pre-selected dividers. For example, U.S. Pat. No. 7,097,369 to Barry et al., which is incorporated herein by reference, discloses a method and apparatus for inserting tabs in a print job. Additionally, U.S. Pat. No. 6,549,300 to Motamed et al., which is incorporated herein by reference, discloses a method and apparatus that configures a printer for printing ordered stock by using a template. Further, U.S. Pat. No. 7,515,295 to Kremer et al., which is incorporated herein by reference, discloses a computer program to operate a printer to insert tabs into a multi-page document. Barry et al., Motamed et al., and Kremer et al., however, each fail to disclose automatically inserting a divider in a multi-file document of various file formats.

Barry et al. discloses a method where first, a position is selected within a document to insert a tab sheet. A tab sheet is then created as a rasterized tab sheet image that has a rasterized tab specific image disposed in a predetermined location on the rasterized image. The created tab image is then inserted into the document. Barry et al., however, is limited in that the method for inserting tab sheets is limited to a single document of one file and file format. Although this is not explicitly stated, the description herein continuously refers to "a document" and refers to a "document defined image space" which is logically associated with one file type.

Motamed et al., discloses a method and apparatus for tab printing where the focus is on having many tab printing options by providing options which include setting the number of positions, the text offset per tab, the tab media size, text rotation, document reading order, tray source, the tab font size, the tab font type, tab sheet location, tab text, and text color. Once these options are selected, they can be saved for repeated uses. Motamed et al. does not teach the automatic insertion of dividers as taught in the present invention.

Kremer et al. discloses a computer program that operates a printer to insert tabs into a multipage document. A graphical user display allows the user to specify a page for the tabs. The text and graphics may be entered on the tab or selected from templates for labels and style. Kremer et al. does not disclose the automatic insertion of dividers between discreet files as in the present invention.

Based on the foregoing, it is believed that a need exists for improved systems and methods for automatically printing and inserting dividers into multi-file and multi-section documents. A need also exists for printing and inserting dividers between discreet files obtained through multiple sources, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by reviewing the entire specification, claims, drawings, and abstract as a whole.

It is, therefore, one aspect of the disclosed embodiments to provide for an improved printing method and system.

It is another aspect of the disclosed embodiments to provide for an improved document assembly method and system.

It is yet another aspect of the disclosed embodiments to provide for an improved printing method and system for automatically adding dividers between a multi-file document, wherein each file constitutes a discrete file.

It is a further aspect of the disclosed embodiments to provide a faster and more efficient print job programming.

The aforementioned aspects and other objectives and advantages can now be achieved as described herein. A method and system is disclosed for automatically adding dividers between sections (e.g., chapters) of a multi-section document, wherein each section is a discrete file. Upon selecting this mode of operation, job assembly software (e.g. Xerox FreeFlow Express to Print, a web to print e-commerce application like FreeFlow Web Services or software plug in for an application capable of merging multiple PDL files into a single output document) can add a divider page between each pair of files. The media programming for the divider can be retrieved from stored values or can be user specified. The dividers may be added singly as each file is added to the document or added as a group between all section boundaries. Dividers can be automatically inserted in a multi-segment document in order to support a faster and more efficient print job programming for multi segment documents.

In some embodiments, a user can initially launch a print job assembly software tool or application. This tool may be configured in the form of a standalone software application (Xerox FreeFlow Express to Print, a web to print e-commerce web site, e.g. Xerox FreeFlow Web Services) or software plug-in to any software that can comprehend print job programming for more than one file at a time. Print drivers typically do not support print job programming for multiple files.

The user selects multiple files to be produced as a single document. These files are frequently PDF format files, but may be of any format that can be predictably converted to a print ready form. A user can then specify which section or chapter dividers should be added to the document and optionally, the media programming for the dividers. Media programming includes the size, substrate (color, basis weight), and other physical converting characteristics (tabs, drilled, lamination, etc).

The job programming for the document can be modified to reflect an exception page at the junction of each input file pair with the media programming as specified above. The addition of a divider with a job programmed for two-sided printing may result in, for example, a chapter starts where the page count within a file is an odd number.

When creating multi-section or multi-chapter documents, users of job assembly software applications must manually add dividers between each section. This manual operation slows the job assembly process and is a source of potential errors of omission, misplacement, and incorrect media programming. The disclosed embodiments can be employed to automatically add dividers between sections or chapters of a multi-section document where each section is a discrete file. Upon selecting this mode of operation, job assembly software can add a divider page object between each pair of files. The media programming for the divider can then be retrieved from stored values or specified. The dividers can be added singly as each file is added to the document or can be added as a group between all section boundaries.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

FIGS. 1-4 are provided as exemplary diagrams of data-processing environments in which embodiments of the present invention may be implemented. It should be appreciated that FIGS. 1-4 are only exemplary and are not intended to assert or imply any limitation with regard to the environments in which aspects or embodiments of the disclosed embodiments may be implemented. Many modifications to the depicted environments may be made without departing from the spirit and scope of the present invention.

Figure 1:
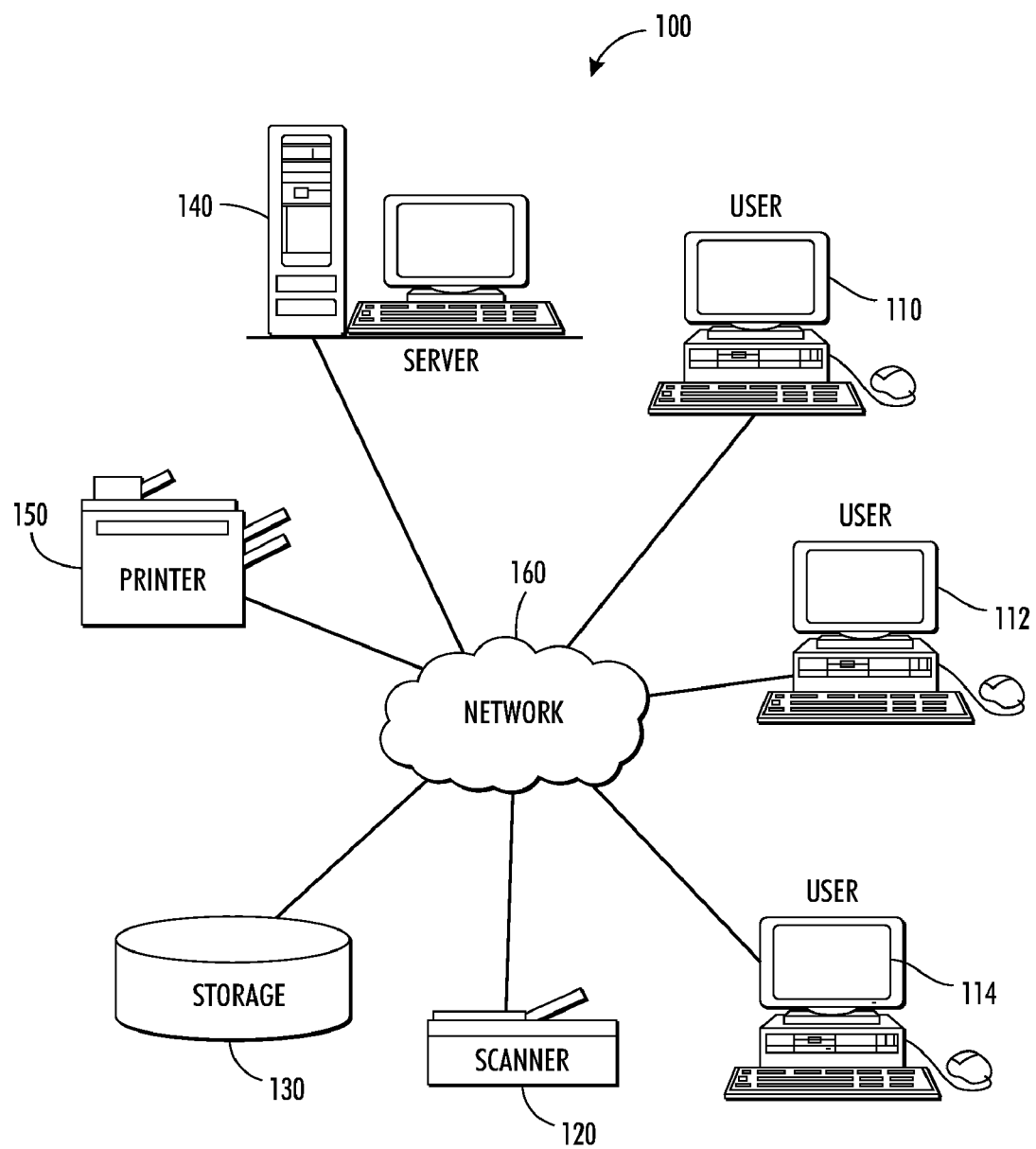
FIG. 1 illustrates a schematic view of an automatic divider insertion and printing system comprising multiple users, scanner, server, storage device, and printer, in accordance with the disclosed embodiment.

As illustrated in FIG. 1, the disclosed embodiments may be implemented in the context of an automatic divider insertion and rendering system 100 comprising, for example, computers from multiple users 110, 112, and 114, scanner 120, server 140, storage device 130, and a rendering device 150, interconnected through a network 160. The automatic divider insertion and printing system 100 contains network 160, which is the medium used to provide communications links between various devices and computers connected together within system 100. Note that network 160 may be, for example, a local network or a wide area network, or even a broad based computer network such as the Internet. Network 160 can also be configured as a wireless network (e.g., 802.11 type network, a Bluetooth network, etc). Network 160 can thus include connections such as wire, wireless communication links, or fiber optic cables.

In the depicted example, server 140 connects to network 160 along with storage unit 130. In addition, users 110, 112, and 114 connect to network 160. These users 110, 112, and 114 may be, for example, personal computers or network computers. Additional users, in addition to the computers from multiple users 110, 112, and 114 illustrated may provide data files to one user to produce a rendered product (e.g., a printed product) with dividers automatically inserted between the files.

In the depicted example, server 140 provides data such as boot files, operating system images, and applications to users 110, 112, and 114. The server 140 may provide job assembly software (e.g., similar to Xerox FreeFlow Express to Print, a web to print e-commerce application like FreeFlow Web Services or software plug in for an application capable of merging multiple PDL files into a single output document) that can add a divider page between each pair of files. Users 110, 112, and 114 are authorized users to server 140 in this example. The system 100 can include additional servers, users, and other devices not shown. Specifically, users may connect to any member of a network of servers, which provide files to each other for compilation and printing with automated divider insertion.

In some embodiments, software applications (e.g. Xerox FreeFlow Express to Print, a web to print e-commerce application like FreeFlow Web Services or software plug in for an application capable of merging multiple PDL files into a single output document), stored in storage 130, generally include a kernel or operating system and a shell or interface. One or more application programs may be "loaded" from storage 130 into the computers of multiple users 110, 112, and 114. Then, any of the multiple users 110, 112, and 114 can render (e.g., print) the final product document with dividers automatically inserted in between discreet files.

As illustrated, the various components of the system 100 communicate electronically through a network 160. The network 160 may be a subsystem that transfers data between, for example, computer components within the system 100 or to and from other data-processing devices, components, computers, etc.

In the depicted example, the system 100 can include the use of Internet with network 160 representing a worldwide collection of networks and gateways that use the Transmission Control Protocol/Internet Protocol (TCP/IP) suite of protocols to communicate with one another. At the heart of the Internet is a backbone of high-speed data communication lines between major nodes, or host computers, consisting of thousands of commercial, government, educational, and other computer systems that route data and messages. Of course, the system 100 also may be implemented as a number of different types of networks such as, for example, an intranet, a local area network (LAN), or a wide area network (WAN). FIG. 1 is intended as an example and not as an architectural limitation for varying embodiments of the present invention.

Figure 2:
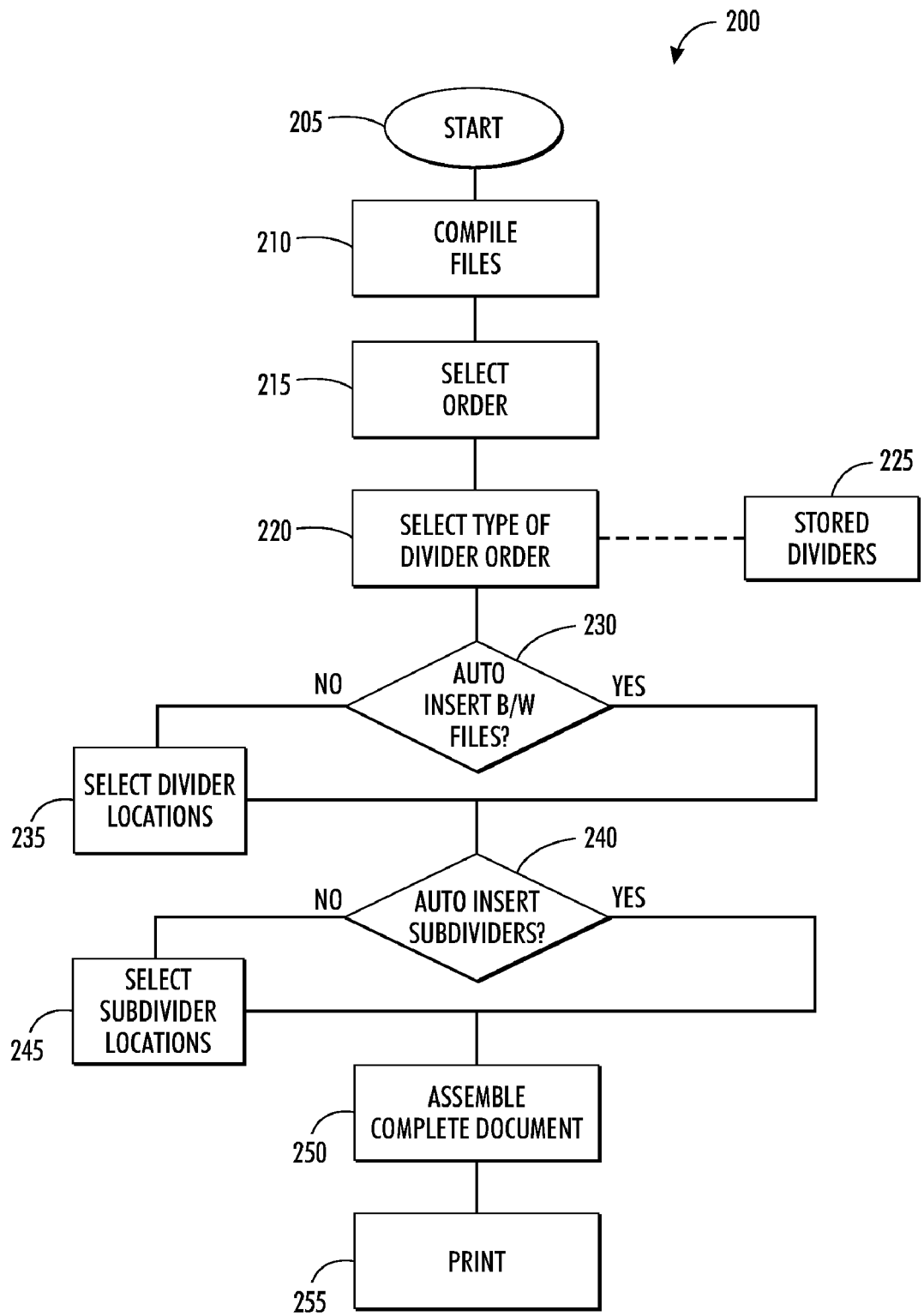
FIG. 2 illustrates a flow chart diagram of an automatic divider insertion and printing method, in accordance with the disclosed embodiments.

FIG. 2 illustrates a flow chart depicting logical operational steps of an automatic divider insertion and printing method 200, in accordance with the disclosed embodiments. As indicate at block 205, the process begins by having multiple users 110, 112, and 114 submit discreet document files through a network such as, for example, network 160. Document files can also be provided through a scanner 120 or retrieved from storage 130. It can be appreciated that the method 200 depicted in FIG. 2 may be reduced to a software program and may be loaded to, for example, the automatic divider insertion and rendering system 100 depicted in FIG. 1. That is, each of steps/operations depicted in FIG. 2 can be implemented by executing a program instruction in a data-processing system such as a computer, processor, etc.

One or more of the multiple users 110, 112, and 114 compiles the document files 210 and selects the order 215 of the documents. Thereafter, one or more of the multiple users 110, 112, and 114 selects the type of divider 220 to be inserted from stored dividers 225 which are templates of the particular type of dividers stored in storage 130 or from the computers of multiple users 110, 112, and 114. After inputting the text strings onto the dividers, these settings can be saved for repeated use. The saved settings can be shared through the interconnectivity provided in the automatic divider insertion and printing system 100 through network 160.

The dividers are automatically inserted 230 in-between the document files. The automatic insertion of dividers between the files is envisioned to be the default setting for the automatic divider insertion and printing method 200. The document files can be Portable Document Format (PDF), a Page Description Language (PDL), or any number of document types that can be reduced to printing. The individual document files can be any number of combinations of the various types of files. That is, the files do not have to be reformatted to one file type in order for the automatic insertion of dividers. One or more of the users 110, 112, and 114 can choose to override the defaulted automatic divider setting and select the divider locations 235. The users 110, 112, and 114 also have the option to add additional dividers within each file in addition to those automatically inserted between discreet files.

Once the dividers are selected for insertion, one or more of the users 110, 112, and 114 can choose to insert subdividers 240 within the individual document files. The subdividers can be automatically inserted based on previous settings marked in the individual document files, set as a preferred default setting. Otherwise, one or more of the users 110, 112, and 114 can choose to override the default settings and select subdivider locations 245.

The dividers will follow a sequential order to ensure that the labels 470 of the dividers are aligned. The subdividers will always start with a first position of a label 470 at the beginning of each subsection. Any unused dividers ending in the series will be discarded in order to have the first label 470 in position for the next subsection in the next divided document file. The dividers are not limited between files and subsections. It is envisioned that within a large complex document there may be multiple sub sub-sections.

Finally, the final document is assembled 250 from the individual document files and is sent to the printer to print 255. The automatic divider insertion and printing method 200 reduces the time and effort associated with taking multiple document files of various formats from multiple sources and produces a complete assembled document.

Figure 3:
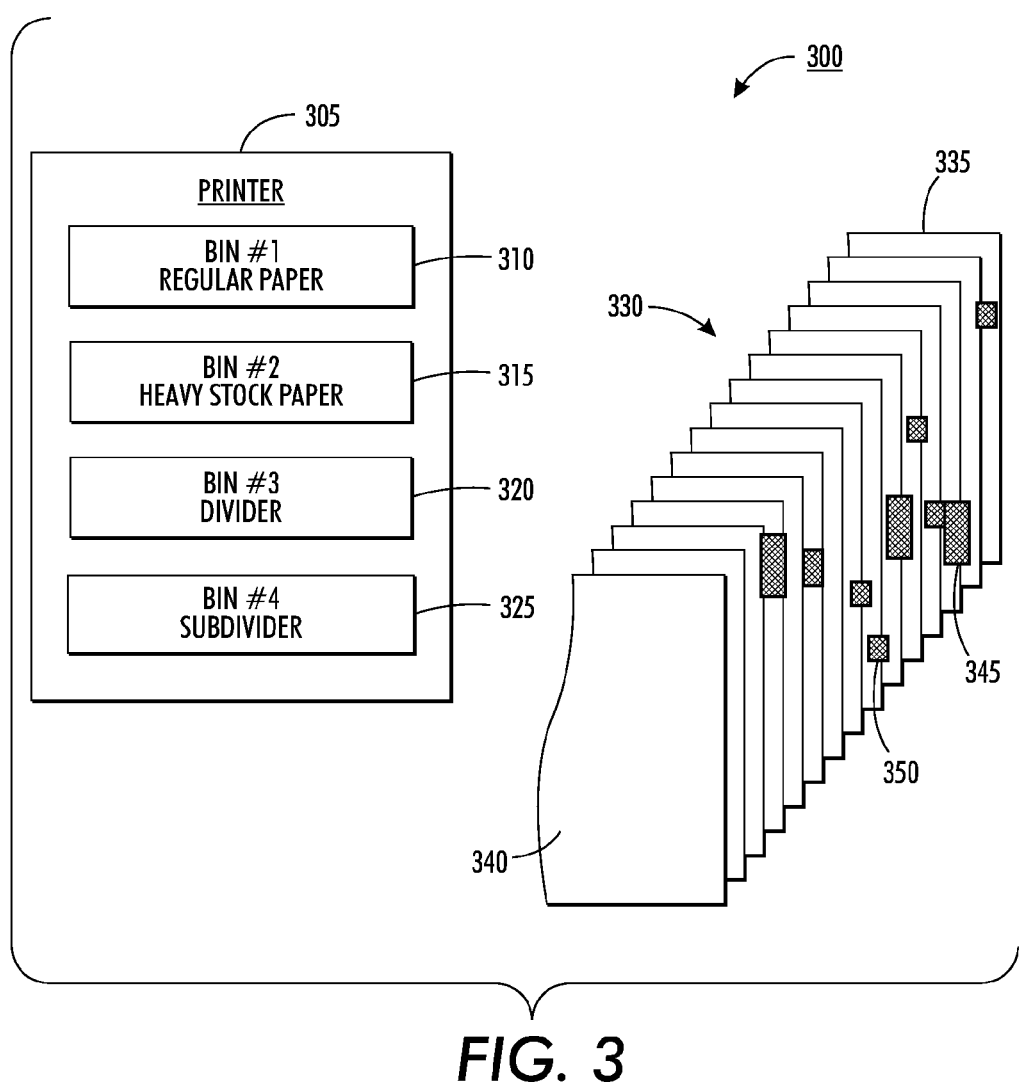
FIG. 3 illustrates a schematic view of an automatic divider insertion and printing system comprising a printer with dividers and final document output with file and section dividers, in accordance with the disclosed embodiment.

FIG. 3 illustrates a schematic view of an automatic divider insertion and printing system 300 including a printer 305 with dividers 320, sub-dividers 325, and final document output with file and section dividers 330, in accordance with the disclosed embodiment. The final document output 330 can have options not only to provide dividers 345 in between the individual document files as well as subdividers 350 within the individual files, it can also have the option of providing heavy stock papers 315 for the front cover 340 and back cover 335. The pages in-between the cover pages 340 and 335 can comprise regular paper 310. This flexibility and assorted options allows for a customized final document product with heavy stock covers 340 and 335, dividers 345, and subdividers 350; thus resulting in a complete product without the need to manually replace certain parts of the final product.

In order to provide the options of various types of papers (regular paper 310, heavy stock paper 315, divider 320, and subdivider 325), the printer 305 must comprise multiple paper bins to provide the capability to fashion a customized final document output 330 as depicted in the automatic divider insertion and printing system 300.

Figure 4:
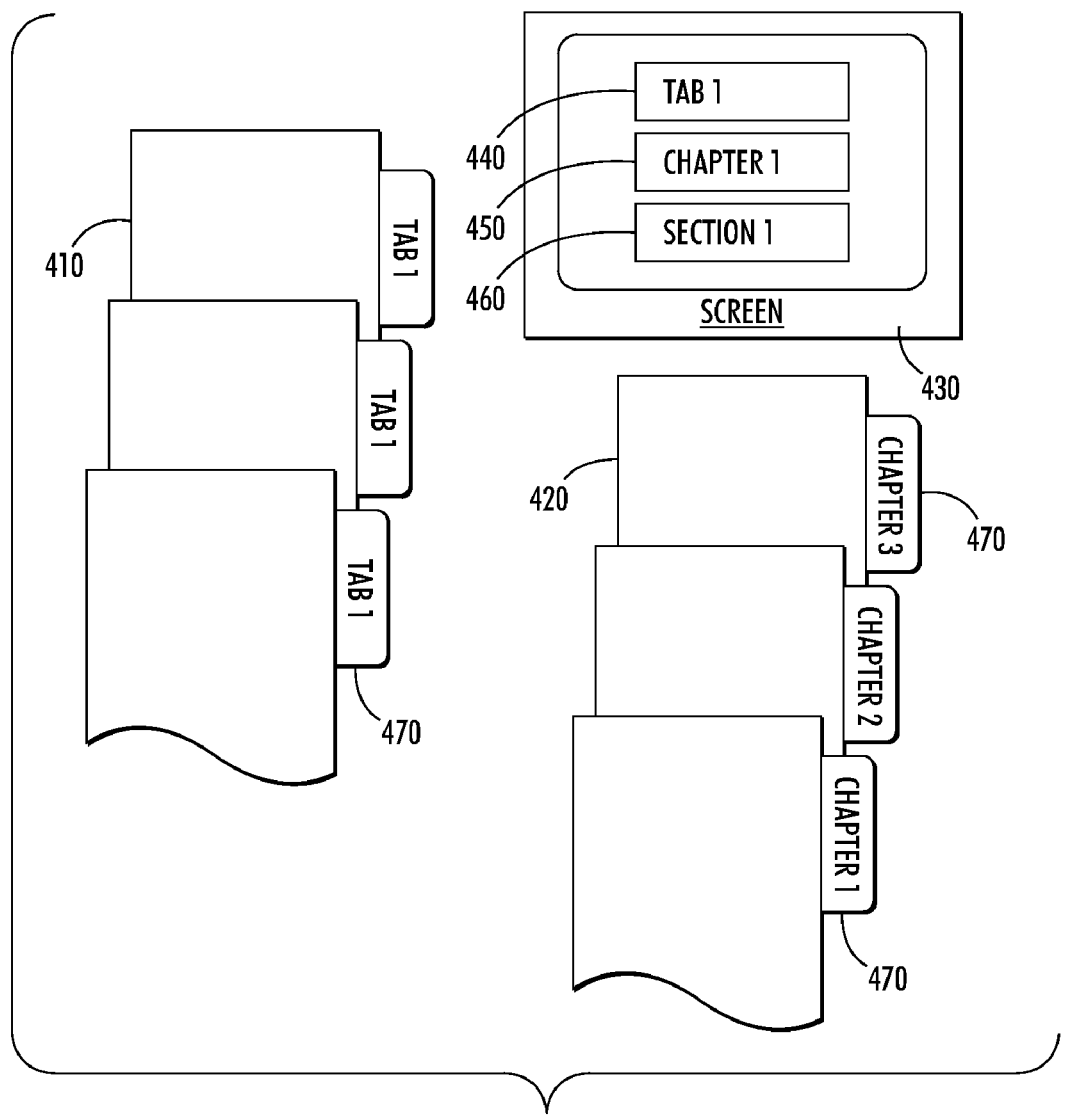
FIG. 4 illustrates a graphical representation of a computer or printer screen with storable divider templates in which aspects of the disclosed embodiments may be implemented.

FIG. 4 illustrates a graphical representation of a computer or printer screen 430 with storable divider templates 440, 450, and 460 in which aspects of the disclosed embodiments may be implemented. The screen 430 can be from a computer or from a printer; thus, the invention allows the capability for automatic divider insertion and printing at a computer or at a printer. One or more of the users 110, 112, and 114 can choose various wording formats 440, 450, and 460 to label the dividers and subdividers. The dividers with tab designations 410 and chapter designations 420 are illustrated as examples of how selection of those formats can appear on the dividers and subdividers. The computer or printer screen 430 also depicts section designations 460. These are just examples and are not intended to limit the possibilities of the various formats, fonts, color, and designation language available for each divider and subdivider. Further, combinations of these formats are also envisioned.

The labels 470 of the dividers depicted in the graphical representation can be placed on the right-hand side of a portrait layout paper. However, the labels 470 are not limited to the right-hand side position: they may be placed anywhere (top, bottom, right, and left edges) on the dividers.

A method for inserting dividers in a print job is disclosed, comprising compiling a plurality of individual files into a single document; arranging the individual files among the plurality of individual files into a preferred order; and inserting at least one divider in-between each of the individual files among the plurality of files in order to thereafter generate a template comprising a print layout associated with at least one divider and render a complete document comprising the individual files among the plurality of individual files in the preferred order with at least one divider automatically inserting therein and including text strings thereof.

In another embodiment of such a method, the individual files consists a plurality of different file formats. These individual files may be provided from a plurality of users as well as from various sources such as from a scanner, from a shared storage device, or from the Internet. The source of the files that will ultimately be assembled to have automatic dividers inserted is not limited.

In yet another embodiment of such a method, the additional step of inserting divider in-between sections within each of the individual files is also available. Thus, the final assembled document may have distinct dividers in-between individual discreet files as well as different dividers within each of the discreet files. To ensure that the sections and subsections are easily identifiable, the type of divider can be different. Further, the divider for the sections can utilize a different divider text strings from the divider for individual files. This allows for a well-organized and well-tabulated final document with sections and subsections. If the final document is printed on two sides, the divider is placed only on the odd numbered pages for two-sided printing. Otherwise, the tabs will appear on the opposite side of the intended location.

It can be appreciated that in another embodiment of such a method, the divider is automatically placed in between the individual files. However, the option exists to automatically place the dividers in pre-designated pages. Further, there will be flexibility to place dividers in-between selected pages. The dividers are inserted in a sequential order to ensure that the tabs of the dividers will follow in a logical order resulting in a visible cascading arrangement of the tabs. At the start of a new section, the subsection dividers will again start from the first tab position. Any unused dividers in the sequence will be discarded to ensure a first tab position for a new divider sequence.

Further, in another embodiment of such a method, a software program in a computer compiles the individual files before sending it to a printer for automatic insertion of dividers. Additionally, in an alternate embodiment, the software program that compiles the individual files, is located in the printer; thus, allowing the user to manipulate the order and layout of the final document at the printer rather than at a computer.

A system for inserting dividers in a print job is disclosed, comprising a plurality of individual files from a computer belonging to one or more users; a scanner to scan the individual files; a software program to arrange the individual files among the plurality of individual files into a preferred order; and a printer to insert at least one divider in-between each of the individual files among the plurality of files in order to thereafter generate a template comprising a print layout associated with at least one divider and render a complete document comprising the individual files among the plurality of individual files in the preferred order with at least one divider automatically inserting therein and including text strings thereof.

In another embodiment of such a system, the individual files consists a plurality of different file formats. These individual files may be provided from a plurality of users as well as from various sources such as from a scanner, from a shared storage device, or from the Internet. The source of the files that will ultimately be assembled to have automatic dividers inserted is not limited.

In yet another embodiment of such a system, the additional step of inserting divider in-between sections within each of the individual files is also available. Thus, the final assembled document may have distinct dividers in-between individual discreet files as well as different dividers within each of the discreet files. To ensure that the sections and subsections are easily identifiable, the type of divider can be different. Further, the divider for the sections can utilize a different divider text strings from the divider for individual files. This allows for a well-organized and well-tabulated final document with sections and subsections. If the final document is printed on two sides, the divider is placed only on the odd numbered pages for two-sided printing. Otherwise, the tabs will appear on the opposite side of the intended location.

It can be appreciated in another embodiment of such a system; the divider is automatically placed in between the individual files. However, the option exists to automatically place the dividers in pre-designated pages. Further, there will be flexibility to place dividers in-between selected pages. The dividers are inserted in a sequential order to ensure that the tabs of the dividers will follow in a logical order resulting in a visible cascading arrangement of the tabs. At the start of a new section, the subsection dividers will again start from the first tab position. Any unused dividers in the sequence will be discarded to ensure a first tab position for a new divider sequence.

Further, in another embodiment of such a system, a software program in a computer compiles the individual files before sending it to a printer for automatic insertion of dividers. Additionally, in an alternate embodiment, the software program that compiles the individual files, is located in the printer; thus, allowing the user to manipulate the order and layout of the final document at the printer rather than at a computer.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A computer-implemented method for inserting dividers in a print job, said method comprising:
    compiling a plurality of individual files wherein said plurality of files comprises more than one file format by executing a program instruction in a data-processing system; and
    inserting at least one divider in-between each individual file among said plurality of files, wherein said file format of said individual files is preserved by executing a program instruction in a data-processing system, in order to thereafter generate a template comprising a print layout associated with said at least one divider and render a complete document comprising said individual files among said plurality of individual files in a preferred order with said at least one divider automatically inserted therein and including text strings thereof.

2. The method of claim 1 further comprising arranging said individual files among said plurality of individual files in a preferred order, by executing a program instruction in a data-processing system.

3. The method of claim 1 further comprising configuring said plurality of individual files to comprise files having different printer file formats, by executing a program instruction in a data-processing system.

4. The method of claim 1 further comprising deriving individual files among said plurality of individual files from a plurality of users, by executing a program instruction in a data-processing system.

5. The method of claim 1 further comprising inserting said at least one divider in-between sections within each individual file among said plurality of files, by executing a program instruction in a data-processing system.

6. The method of claim 1 further comprising placing said at least one divider only on odd numbered pages for two-sided printing, by executing a program instruction in a data-processing system.

7. The method of claim 5 further comprising configuring said at least one divider for said sections to utilize different text strings from said at least one divider for individual files among said plurality of files, by executing a program instruction in a data-processing system.

8. The method of claim 1 further comprising automatically placing said at least one divider in-between each individual file among said plurality of individual files, by executing a program instruction in a data-processing system.

9. The method of claim 1 further comprising automatically placing said at least one divider in pre-designated pages, by executing a program instruction in a data-processing system.

10. The method of claim 1 further comprising placing said at least one divider in-between selected pages, by executing a program instruction in a data-processing system.

11. The method of claim 5 further comprising starting a next set of said at least one divider for said sections from a first tab position, by executing a program instruction in a data-processing system.

12. The method of claim 1 further comprising automatically compiling each individual file among said plurality of individual files prior to sending each individual file among said plurality of individual files to a rendering device for rendering, by executing a program instruction in a data-processing system.

13. The method of claim 11 further comprising automatically compiling said individual files at said rendering device, by executing a program instruction in a data-processing system.

14. A system for inserting dividers in a print job, said system comprising:
- a processor;
- a data bus coupled to said processor; and
- a non-transitory computer-usable medium embodying computer code, said computer-usable medium being coupled to said data bus, said computer program code comprising instructions executable by said processor and configured for:
  - compiling a plurality of individual files, wherein said plurality of files comprises more than one file format; and
  - inserting at least one divider in-between each individual file among said plurality of files wherein said file format of said individual files is preserved in order to thereafter generate a template comprising a print layout associated with said at least one divider and render a complete document comprising said individual files among said plurality of individual files in a preferred order with said at least one divider automatically inserted therein and including text strings thereof.

15. The system of claim 14 wherein said instructions are further configured for:
- arranging said individual files among said plurality of individual files in a preferred order; and
- modifying said plurality of individual files to comprise files having different file formats.

16. The system of claim 14 wherein said instructions are further configured for:
- deriving individual files among said plurality of individual files from a plurality of users; and
- inserting said at least one divider in-between sections within each individual file among said plurality of files.

17. A system for inserting dividers in a print job, said system comprising:
- a processor;
- a data bus coupled to said processor; and
- a non-transitory computer-usable medium embodying computer code, said computer-usable medium being coupled to said data bus, said computer program code comprising instructions executable by said processor and configured for:
  - compiling a plurality of individual files, wherein said plurality of files comprises more than one file format
  - arranging said individual files among said plurality of individual files in a preferred order; and
  - inserting at least one divider in-between each individual file among said plurality of files wherein said file format of said individual files is preserved, in order to thereafter generate a template comprising a print layout associated with said at least one divider and render a complete document comprising said individual files among said plurality of individual files in a preferred order with said at least one divider automatically inserted therein and including text strings thereof.

18. The system of claim 17 wherein said instructions are further configured modifying said plurality of individual files to comprise files having different file formats.

19. The system of claim 17 wherein said instructions are further configured for automatically placing said at least one divider in-between each individual file among said plurality of individual files.

20. The system of claim 17 wherein said instructions are further configured for automatically placing said at least one divider in pre-designated pages.

* * * * *